(12) United States Patent
So et al.

(10) Patent No.: US 11,277,210 B2
(45) Date of Patent: Mar. 15, 2022

(54) METHOD, SYSTEM AND STORAGE MEDIUM FOR SIGNAL SEPARATION

(71) Applicant: The Hong Kong University of Science and Technology, Hong Kong (CN)

(72) Inventors: Richard Hau Yue So, Hong Kong (CN); Jiangang Zhang, Hong Kong (CN)

(73) Assignee: THE HONG KONG UNIVERSITY OF SCIENCE AND TECHNOLOGY, Hong Kong (CN)

(*) Notice: Subject to any disclaimer, the term of this patent is extended or adjusted under 35 U.S.C. 154(b) by 969 days.

(21) Appl. No.: 15/777,598

(22) PCT Filed: Aug. 15, 2016

(86) PCT No.: PCT/CN2016/095283
§ 371 (c)(1),
(2) Date: May 18, 2018

(87) PCT Pub. No.: WO2017/084397
PCT Pub. Date: May 26, 2017

(65) Prior Publication Data
US 2021/0211207 A1      Jul. 8, 2021

Related U.S. Application Data

(60) Provisional application No. 62/386,136, filed on Nov. 19, 2015.

(51) Int. Cl.
*H04B 15/00* (2006.01)
*H04B 17/20* (2015.01)
(Continued)

(52) U.S. Cl.
CPC ........ *H04B 15/005* (2013.01); *G10L 21/0272* (2013.01); *G10L 21/0356* (2013.01); *H04B 1/18* (2013.01); *H04B 17/20* (2015.01)

(58) Field of Classification Search
CPC ...... H04B 1/18; H04B 5/0006; H04B 15/005; H04B 15/02; H04B 17/00; H04B 17/20;
(Continued)

(56) References Cited

U.S. PATENT DOCUMENTS 5,685,317 A * 11/1997 Sjostrom ............... A61B 5/352
                                                     600/528
7,339,959 B2    3/2008 Nio et al.
(Continued)

FOREIGN PATENT DOCUMENTS

CN    102509552 A    6/2012
CN    103455171 A    12/2013
(Continued)

OTHER PUBLICATIONS

International Search Report for PCT Application No. PCT/CN2016/095283, dated Nov. 3, 2016, 3 pages.
(Continued)

*Primary Examiner* — Young T. Tse
(74) *Attorney, Agent, or Firm* — Amin, Turocy & Watson, LLP

(57) ABSTRACT

Methods, systems and storage medium for separating a target signal from noise are disclosed. A method comprises providing a plurality of input signals, each of the plurality of input signals comprising the target signal; synchronizing the plurality of input signals; and separating the plurality of synchronized input signals into the target signal and the noise.

19 Claims, 2 Drawing Sheets

(51) Int. Cl.
*H04B 1/18* (2006.01)
*G10L 21/0356* (2013.01)
*G10L 21/0272* (2013.01)

(58) Field of Classification Search
CPC .. H04B 17/21; G10L 21/0272; G10L 21/0356
USPC ...... 375/224, 254, 285, 354; 381/56–58, 60, 381/317, 71.1, 71.7, 94.3, 94.7, 94.8, 94.9
See application file for complete search history.

(56) References Cited

U.S. PATENT DOCUMENTS

| | | | |
|---|---|---|---|
| 7,383,178 | B2 | 6/2008 | Visser et al. |
| 8,229,740 | B2 | 7/2012 | Nordholm et al. |
| 8,391,509 | B2 | 3/2013 | Lee et al. |
| 8,737,652 | B2 | 5/2014 | Kornagel |
| 2008/0075428 | A1* | 3/2008 | Hashimoto ............ H04N 5/85 386/201 |
| 2010/0183158 | A1 | 7/2010 | Haykin et al. |
| 2012/0215519 | A1 | 8/2012 | Park et al. |
| 2014/0086359 | A1* | 3/2014 | Daughtridge ......... H04B 1/123 375/296 |
| 2015/0296294 | A1* | 10/2015 | Paquier ............... G10L 21/0364 381/71.1 |
| 2016/0073203 | A1* | 3/2016 | Kuriger ................. H04R 25/43 381/23.1 |

FOREIGN PATENT DOCUMENTS

| | | |
|---|---|---|
| EP | 0786172 B1 | 7/1997 |
| EP | 1018854 | 7/2000 |
| JP | 2002199359 A | 7/2002 |

OTHER PUBLICATIONS

Hyvaerinen, A., Karhunen, J, Oja, E. "Independent component analysis". John Wiley & Sons, Inc., 2001, 503 pages.

Mitianoudis, Nikolaos, and Mike Davies. "Permutation alignment for frequency domain ICA using subspace beamforming methods." Independent Component Analysis and Blind Signal Separation. Springer Berlin Heidelberg, 2004. 8 pages.

Sawada, Hiroshi, et al. "Solving the permutation problem of frequency-domain BSS when spatial aliasing occurs with wide sensor spacing." Acoustics, Speech and Signal Processing, 2006. ICASSP 2006 Proceedings. 2006 IEEE International Conference on. vol. 5. IEEE, 2006. 4 pages.

Hiroe, Atsuo. "Solution of permutation problem in frequency domain ICA, using multivariate probability density functions." Independent Component Analysis and Blind Signal Separation. Springer Berlin Heidelberg, 2006. 8 pages.

Brutti, Alessio, and Francesco Nesta. "Tracking of multidimensional TDOA for multiple sources with distributed microphone pairs" Computer Speech & Language 27.3 (2013): 660-682.

* cited by examiner

METHOD, SYSTEM AND STORAGE MEDIUM FOR SIGNAL SEPARATION

CROSS-REFERENCES TO RELATED APPLICATIONS

The present application is a U.S. National Stage filing under 35 U.S.C. § 371 of international patent cooperation treaty (PCT) application No. PCT/CN2016/095283, filed Aug. 15, 2016, and entitled "METHOD, SYSTEM AND STORAGE MEDIUM FOR SIGNAL SEPARATION", which claims the benefit of U.S. provisional application No. 62/386,136, filed on Nov. 19, 2015, which applications are hereby incorporated herein by reference in their respective entireties.

TECHNICAL FIELD

The present application relates to the field of signal processing technology, and in particularly to a method, system and storage medium for separating a target signal from an unwanted signal.

BACKGROUND

Noise or unwanted signal interferences are omnipresent. This is a very common problem in applications in audio recordings (e.g., Virtual Reality (VR) 360 audio; hearing aid applications); remote sensing (echo detections; thermal detection; image sensing; radio frequency signature detection); and biomedical applications (e.g., electroencephalography (EEG) signal detections; brain-computer interface; and electromyography (EMG) signals detections) and many others. Noise and target signals can share very similar temporal and frequency characteristics and make the detection of target signals difficult. The separation of the target signals from the noise or unwanted signals will enable selective amplification of the target signals and significantly improve the performance of the sensing systems.

Currently, sensing devices comprise one or more transducers, A/D converters, digital signal processors, signal actuators, etc. The digital processors generally filter the input signals into different frequency bands. A signal level reduction or gain on each particular frequency band is adjusted to fulfil the individual requirement. Subsequently, algorithms are designed for digital processors to separate and isolate signals, reduce unwanted signals and amplify desired signals.

Nevertheless, there exist major limitations on current sensing systems and noise reduction algorithms for real time processing. Unwanted signals or noise often share the same frequency characteristics with the target signals. This makes filtering ineffective in removing the noise.

Usually, target signals and noise come from physically separated sources. Theoretically, when two or more transducers are used to measure these signals, the distances between transducers and sources embedded the necessary information for separating the signal from the noise. However, in practice, inevitable time differences exist when a signal is propagated from a source to different transducers. The propagation delay causes asychronization in the signals measured by the transducers. As a result, the mixed signals comprising multiple independent signals, with the inevitable propagation delays, cannot be well separated into independent signals. Therefore, the unwanted signals cannot be separated from the target signals. Consequently, the desired signals cannot be selectively amplified.

Therefore, there exists a need for technologies that can solve the asychronization effect to effectively separate the noise signal and target signal and thereby improve the perception of target signals through selective amplification.

SUMMARY

One aspect of the present application discloses a method for separating a target signal from noise, comprising: providing a plurality of input signals, each of the plurality of input signals comprising the target signal; synchronizing the plurality of input signals; and separating the plurality of synchronized input signals into the target signal and the noise.

Another aspect of the present application, a system for separating a target signal from noise is provided, which comprising a plurality of input units for inputting a plurality of input signals; a processor; and a memory storing computer readable instructions which when executed by the processor, cause the processor to: synchronize the plurality of input signals; and separate the plurality of synchronized input signals into the target signal and the noise.

Still another aspect of the present application discloses a non-transitory computer storage medium, storing computer-readable instructions which when executed by a processor, cause the processor to perform a method for separating a target signal from noise, the method comprising: providing a plurality of input signals, each of the plurality of input signals comprising the target signal; synchronizing the plurality of input signals; and separating the plurality of synchronized input signals into the target signal and the noise.

According to the present application, the asychronization effect can be reversed or reduced and the noise separation performance can be improved, so that the perception of the target signals can be improved through cancelling the noise.

BRIEF DESCRIPTION OF THE DRAWINGS

Exemplary non-limiting embodiments of the present invention are described below with reference to the attached drawings. The drawings are illustrative and generally not to an exact scale. The same or similar elements on different figures are referenced with the same reference numbers.

DETAILED DESCRIPTION

Hereinafter, the embodiments of the present application will be described in detail with reference to the detailed description as well as the drawings.

The term "independent component analysis" and its abbreviation "ICA" as used herein are intended to refer to methods for minimizing or maximizing the mathematical formulation of mutual information in both time and frequency domain based on statistical methods.

The term "head related transfer function" and its abbreviation "HRTF" as used herein are intended to refer to the difference and/or ratio between an open ear resonance measurement of the user's ear canal or approximate man-made ear in a dummy head and the resonance measurement taken at the signal source in an anechoic chamber as a function of the angle of incoming signal.

Figure 1:
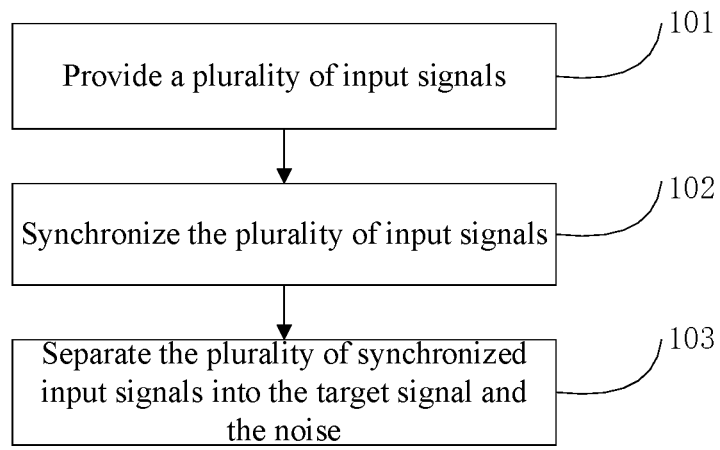
FIG. 1 shows a flow chart of a method for separating a target signal from noise according to an embodiment of the present application.

FIG. 1 shows a flow chart of a method 100 for separating a target signal from noise according to an embodiment of the present application.

At step 101, a plurality of input signals are provided. Each of the input signals comprises the target signal. In addition, the input signals may comprise noises that may be different from each other. However, it should be understood that the noises in the input signals may also be the same, and the present application has no limitation in this aspect. For example, in the scenario of an electronic hearing device, the electronic hearing device typically comprises at least two microphones, each of which may receive a mixture of a signal transmitted from a sound source and an ambient noise. Since the microphones are usually placed at different positions, and thus the signal and the noise are received at mutually distanced locations, and the ambient noises received by the microphones may be different in time domain and/or amplitude from each other. For example, in the scenario of a Brain-Computer Interface device, the EEG device typically comprises at least two electrodes, each of which may receive a mixture of a signal transmitted from an EEG source and an ambient noise. Since the electrodes are usually 6 placed at different positions, and thus the signal and the noise are received at mutually distanced locations, and the ambient noises received by the electrodes may be different in time domain and/or amplitude from each other. Similarly, in the scenario of underwater echo detection, the echo receiving device typically comprises at least two transducers, each of which may receive a mixture of a signal transmitted from a sound source and an ambient noise. Since the transducers are usually placed at different positions, and thus the signal and the noise are received at mutually distanced locations, and the ambient noises received by the transducers may be different in time domain and/or amplitude from each other.

At step 102, the plurality of input signals are synchronized. Step 102 will be described in details with reference to FIG. 2 as follows.

Figure 2:
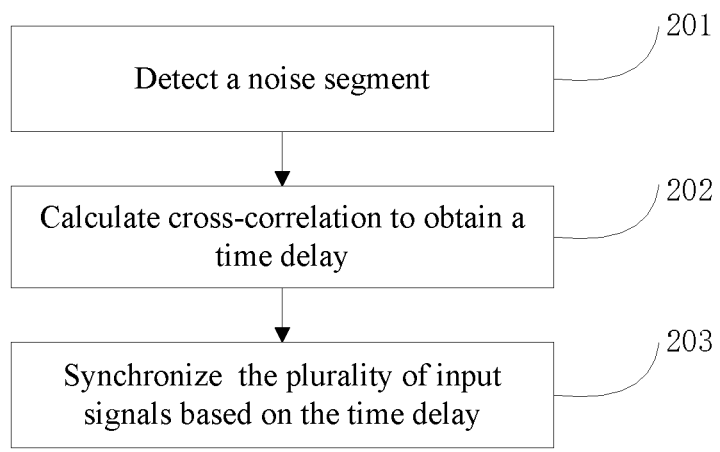
FIG. 2 shows a flow chart of operations of synchronizing a plurality of input signals.

As shown in FIG. 2, at step 201, the noise segment in each of the input signals is detected. The noise segment in each of the input signals is detected by performing, for example, pattern recognition. Those skilled in the art should understand that other appropriate technologies may also be employed in this step. According to the present application, the noise detection process of step 201 does not need to be too precise. As long as one time segment containing the onset of the noise from a low level to a high level (i.e., a step function) is detected, this will be sufficient for completing the remaining steps. This approach largely reduces the need for complicated noise detection processes and thus reduces the computational complexity and cost.

At step 202, cross-correlation is calculated between two of the detected noise segments to obtain a time delay between the detected noise segments.

At step 203, the input signals are synchronized based on the obtained time delay(s). For example, if the time delay between the detected noise segment in a first input signal $f_1(t)$ and the detected noise segment in a second input signal $f_2(t)$ is determined to be $\delta$, the first input signal $f_1(t)$ is synchronized to be $f_1(t-\delta)$. For another example, if the time delay between the detected noise segment in the first input signal $f_1(t)$ and the detected noise segment in the second input signal $f_2(t)$ is determined to be $-\delta$, the first input signal $f_1(t)$ is synchronized to be $f_1(t+\delta)$. Since the input signals are synchronized, the asychronization effect caused by the propagation difference can be reduced or reversed.

Referring to FIG. 1 again, at step 103, the synchronized input signals are separated into the target signal and the noise. In the present embodiment, an independent component analysis (ICA) is performed to separate the synchronized input signals into the target signal and the noise. However, those skilled in the art should understand that other appropriate technologies may be used to separate the input signals into the target signal and the noise, and the present application has no limitation in this aspect.

Once the target signal and the noise are appropriately separated, subsequent processing can be performed on the separated target signal and the noise. For example, the target signal may be selectively amplified and the noise or unwanted signals may be selectively reduced to improve the perception of the target signal.

The signals in the art could be referred to audio signals, image signals, electro-magnetic signals, EEG signals, EMG signals, radio wave signals or other forms of signals that could be picked up by transducers and the present application has no limitation in this aspect.

Particularly, for the specific application to hearing aid application, in order to further narrow down the selectivity of the target audio signal and reduce the noise, the target audio signal should be further selected using its incoming direction to the transducers. Accordingly, the method according to the present embodiment may further comprise: extracting directional information from the separated target signal and noise; and selecting the target signal based on the extracted directional information. In the scenario that the input signals are audio signals, a head-related transfer function (HRTF) may be adopted to extract directional information from the separated target signal and noise. The HRTF is the Fourier Transform of a head related impulse response (HRIR) which is the impulse response between the sound source and the eardrum. The HRTF may contain all physical characteristic values relating to the sound transmission to the ears of a listener or mannequin, including the angle of sound incidence from the sources to the listener's or mannequin's ears. Based on the extracted directional information, the target signals can be further selected by, for example, a series of bandstop/bandpass filters that are tuned to a particular source direction (front: 10.3 kHz to 14.9 kHz; back: 680 to 2 kHz).

According to the present application, the perception of the target signals can be improved while reducing the computational cost. In addition, the input signals are synchronized in time domain and thus the method according to the present application will not introduce any frequency distortion.

Figure 3:
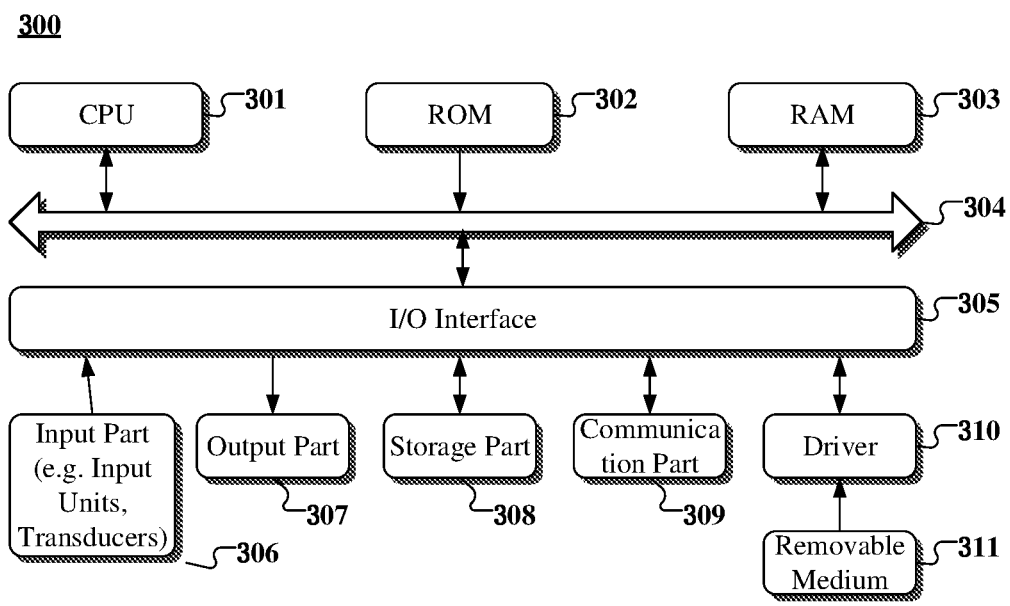
FIG. 3 shows a structural diagram of a computer system adapted to implement an embodiment of the present application.

Now referring to FIG. 3, a structural schematic diagram of a computer system 300 adapted to implement an embodiment of the present application is shown.

As shown in FIG. 3, the computer system 300 includes a central processing unit (CPU) 301, which may execute various appropriate actions and processes in accordance with a program stored in a read-only memory (ROM) 302 or a program loaded into a random access memory (RAM) 303 from a storage section 308. The RAM 303 also stores various programs and data required by operations of the system 300. The CPU 301, the ROM 302 and the RAM 303 are connected to each other through a bus 304. An input/output (I/O) interface 305 is also connected to the bus 304.

The following components may be connected to the I/O interface 305: an input section 306 comprising a keyboard, a mouse, etc.; an output section 307 comprising a liquid crystal display device (LCD) and a speaker etc.; a storage section 308 comprising a hard disk, etc.; and a communication section 309 comprising a network interface card, such as a LAN card and a wireless Near-field communication unit. The communication section 309 performs communication processes via a cloud network, such as the Internet. A driver 310 is also connected to the I/O interface 305 as required. A removable medium 311, such as a magnetic disk, an optical disk, a magneto-optical disk, a semiconductor memory, may be installed on the driver 310, to facilitate the retrieval of a computer program from the removable medium 311, and the installation into the storage section 308 as needed.

According to an embodiment of the present disclosure, the process described above with reference to the flow chart may also be implemented as an embedded computer system similar to the computer system 300 but without keyboard, mouse, and hard disk. Update of programs will be facilitated via a wireless communication or cabled communication (309).

In particular, according to an embodiment of the present disclosure, the process described above with reference to the flow chart may be implemented as a computer software program. For example, an embodiment of the present disclosure comprises a computer program product, which comprises a computer program that is tangibly embodied in a machine-readable medium. The computer program comprises program codes for executing the method as shown in the flow charts. In such an embodiment, the computer program may be downloaded and installed from a network via the communication section 309, and/or may be installed from the removable media 311.

The flow charts and block diagrams in the figures illustrate architectures, functions and operations that may be implemented according to the system, the method and the computer program product of the various embodiments of the present invention. In this regard, each of the blocks in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a different sequence from that the sequence as shown in the figures. For example, in practice, two blocks in succession may be executed substantially in parallel, or in a reverse order, depending on the functionalities involved. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor. The names of these units or modules are not considered as a limitation to the units or modules.

In another aspect, the present application also provides a computer readable storage medium. The computer readable storage medium may be the computer readable storage medium included in the apparatus in the above embodiments, and it may also be a separate computer readable storage medium which has not been assembled into the apparatus. The computer readable storage medium stores one or more programs, which are used by one or more processors to execute the method for separating a target signal from noise described in the present application.

The forgoing is only a description of the preferred embodiments of the present application and the applied technical principles. It should be understood by those skilled in the art that the invention scope of the present application is not limited to technical solutions formed by the particular combinations of the above technical features. It should also cover other technical solutions formed by any combinations of the above technical features or equivalent features thereof without departing from the concept of the invention. For example, a technical solution formed by replacing the features disclosed above by technical features with similar functions is also within the scope of the present invention.

What is claimed is:

1. A method comprising:
    receiving, by respective input units of a system comprising a processor, input signals, the input signals comprising a target signal and respective noise signals;
    synchronizing the input signals, resulting in synchronized input signals;
    separating the synchronized input signals into the target signal and the respective noise signals;
    extracting respective directional information associated with the target signal and the respective noise signals, the respective directional information representative of respective directions from the respective input units with respect to at least one position of at least one source of the target signal and the respective noise signals; and
    selecting the target signal based on the respective directional information.

2. The method of claim 1, wherein the synchronizing the input signals comprises:
    detecting respective noise segments in respective input signals, resulting in detected noise segments;
    calculating a cross-correlation value between the detected noise segments to obtain a time delay between the detected noise segments; and
    performing the synchronizing of the input signals based on the time delay.

3. The method of claim 2, wherein the detecting the respective noise segments in the respective input signals comprises:
    detecting the respective noise segments in the respective input signals by performing pattern recognition on the respective input signals.

4. The method of claim 1, wherein the input signals are obtained at mutually distanced locations.

5. The method of claim 1, wherein the separating the synchronized input signals into the target signal and the respective noise signals comprises:
    separating the synchronized input signals into the target signal and the respective noise signals using an independent component analysis of the synchronized input signals.

6. The method of claim 1, wherein the extracting the respective directional information associated with the target signal and the respective noise signals comprises:
    extracting the respective directional information associated with the target signal and the respective noise signals using a head-related transfer function to extract the respective directional information.

7. The method of claim 1, wherein an input signal of the input signals is picked up by a transducer.

8. The method of claim 7, wherein the synchronized input signals are representative of one of a group of signals of different type, the group of signals comprising:
    an audio signal of an audio type;

an electroencephalography (EEG) signal of an EEG type;
an electromyography (EMG) signal of an EMG type;
an image signal of an image type; or
a radio frequency (RF) signal of an RF type.

9. A system, comprising:
input units that receive input signals comprising a target signal and respective noise signals;
a processor; and
a memory storing computer readable instructions which when executed by the processor, cause the processor to:
synchronize the input signals, resulting in synchronized input signals;
separate the synchronized input signals into the target signal and the respective noise signals;
extract respective directional information associated with the target signal and the respective noise signals, the respective directional information representative of respective directions from the respective input units with respect to at least one position of at least one source of the target signal and the respective noise signals; and
select the target signal based on the respective directional information.

10. The system of claim 9, wherein the synchronizing the input signals comprises:
detecting respective noise segments in the input signals, resulting in detected noise segments;
calculating a cross-correlation value between the detected noise segments to obtain a time delay between the detected noise segments; and
performing the synchronizing of the input signals based on the time delay.

11. The system of claim 10, wherein the detecting the respective noise segments in the respective input signals comprises:
detecting the respective noise segments in the respective input signals by performing pattern recognition on the respective input signals.

12. The system of claim 9, wherein the input signals are obtained at mutually distanced locations.

13. The system of claim 9, wherein the separating the synchronized input signals into the target signal and the respective noise signals comprises:
separating the synchronized input signals into the target signal and the respective noise signals using an independent component analysis of the synchronized input signals.

14. The system of claim 9, wherein the extracting the respective directional information associated with the target signal and the respective noise signals comprises:
extracting the respective directional information associated with the target signal and the respective noise signals using a head-related transfer function to extract the respective directional information.

15. The system of claim 9, wherein the input signals are signals picked up by respective transducers.

16. The system of claim 15, wherein the synchronized input signals are representative of one of a group of signals of different type, the group of signals comprising:
an audio signal of an audio type;
an electroencephalography (EEG) signal of an EEG type;
an electromyography (EMG) signal of an EMG type;
an image signal of an image type; or
a radio frequency (RF) signal of an RF type.

17. A non-transitory computer-readable storage medium, storing instructions which when executed by a processor, cause the processor to perform operations, comprising:
receiving, by respective input units, input signals, the input signals comprising a target signal and respective noise signals;
synchronizing the input signals, resulting in synchronized input signals;
separating the synchronized input signals into the target signal and the respective noise signals;
extracting respective directional information associated with the target signal and the respective noise signals, the respective directional information representative of respective directions from the respective input units with respect to at least one position of at least one source of the target signal and the respective noise signals; and
selecting the target signal based on the respective directional information.

18. The non-transitory computer-readable storage medium of claim 17, wherein the separating the synchronized input signals into the target signal and the respective noise signals comprises:
separating the synchronized input signals into the target signal and the respective noise signals using an independent component analysis of the synchronized input signals.

19. The non-transitory computer-readable storage medium of claim 17, wherein the synchronizing the input signals comprises:
detecting respective noise segments in respective input signals, resulting in detected noise segments;
cross-correlating the detected noise segments to obtain a time delay between the detected noise segments; and
performing the synchronizing of the input signals based on the time delay.

* * * * *